United States Patent [19]
Motooka

[11] Patent Number: 6,040,896
[45] Date of Patent: Mar. 21, 2000

[54] METHOD OF PRINTING PHOTOSENSITIVE MATERIAL

[75] Inventor: Eiji Motooka, Wakayama, Japan

[73] Assignee: Noritsu Koki Co., Ltd., Wakayama, Japan

[21] Appl. No.: 08/541,099

[22] Filed: Oct. 11, 1995

[30] Foreign Application Priority Data

Oct. 14, 1994 [JP] Japan .................................... 6-249540

[51] Int. Cl.⁷ .......................... G03B 27/58; G03B 29/00; G03B 27/54
[52] U.S. Cl. ................................ 355/72; 355/29; 355/65
[58] Field of Search ................................ 355/29, 65, 72, 355/74, 77; G03B 27/62, 27/53; G03D 15/00

[56] References Cited

U.S. PATENT DOCUMENTS

| | | | |
|---|---|---|---|
| 4,576,469 | 3/1986 | Shiga et al. ............................... | 355/29 |
| 4,819,024 | 4/1989 | Kagayama et al. ......................... | 355/14 |
| 4,939,539 | 7/1990 | Shigaki ..................................... | 355/77 |
| 5,389,999 | 2/1995 | Franci et al. .............................. | 355/28 |

*Primary Examiner*—Richard Moses
*Assistant Examiner*—Shival Virmani
*Attorney, Agent, or Firm*—Wenderoth, Lind & Ponack, L.L.P.

[57] ABSTRACT

Photosensitive material is printed in a printing/exposure unit of a photoprinting/developing machine with high efficiency. The photoprinting/developing machine includes a printing/developing section, a carrier section and a developing section. The carrier section has a sheet distributor to improve the processing capacity of the developing section. The printing/exposure section has an exposure table. If photosensitive sheets are short enough, three of them are fed onto the exposure table all at once.

12 Claims, 11 Drawing Sheets

FIG. 10A
PATTERN A

FIG. 10B
PATTERN B

FIG. 10C
PATTERN C

METHOD OF PRINTING PHOTOSENSITIVE MATERIAL

BACKGROUND OF THE INVENTION

This invention relates to a method of printing sheets of photosensitive material with high efficiency by feeding a plurality of such sheets onto an exposure table at one time.

A roll of photosensitive material is printed simply by feeding it onto an exposure table in the form of a long web, or otherwise it is fed onto the exposure table for printing after cutting the web into a plurality of sheets.

In the former method, distances between the adjacent frames of printed images are sufficiently small so that printing efficiency is high. But when cutting the printed web into a plurality of prints, paper material between the adjacent frames has to be cut off and wasted by the width of about 3 mm. This is a cause of increased operating cost.

In the latter method, sheets cut from a long web of photosensitive material are fed onto an exposure table one at a time. After one sheet has been printed, another sheet is cut from the web and fed onto the exposure table for printing. Namely, it is impossible to cut a sheet from the web of photosensitive material while printing another sheet. Thus, compared with the former method, the latter method is low in printing efficiency.

Large prints such as panorama-size prints are gaining popularity these days. For such large-size printing, a large exposure table is needed. When printing photosensitive material in a roll form, the printing efficiency will not drop so markedly by using a large exposure table.

But in order to avoid the waste of paper, it is preferable to print photosensitive material after cutting it into a plurality of sheets. In this case, the larger the exposure table, the longer the processing time tends to be, because after printing one sheet, another sheet has to be cut and fed to the printing position.

But in this method, after printing, it is possible to feed the sheets into a developing unit in two or more rows. Thus, the sheets can be developed with high efficiency. No such parallel processing is possible with the method in which a web of photosensitive material is printed as it is.

An object of this invention is to provide a method of printing photosensitive material in which, in order to improve printing efficiency, a plurality of sheets of photosensitive material are fed not one at a time but at the same time if such plurality of sheets can be placed on an exposure table simultaneously.

SUMMARY OF THE INVENTION

According to this invention, there is provided a method of transferring images recorded on films onto sheets of photosensitive material by photoprinting, the method comprising the steps of feeding a web of photosensitive material from a supply unit to a cutter, cutting the web of photosensitive paper into a plurality of sheets, and feeding the sheets onto an exposure table for photoprinting, wherein if the sheets can be placed on the exposure table by a predetermined number which is not one at a time, the sheets are fed onto the exposure table so as to print one of the sheets and cut another one of the sheets simultaneously while discharging still another one of the sheets.

The number of photosensitive sheets to be placed on the exposure table at a time is preferably determined based on signals that designate print sizes. Otherwise, the number of photosensitive sheets to be placed on the exposure table at a time may be determined by calculating the feed length and the print sizes of the adjacent sheets from data on image sizes detected by a scanner and comparing the feed length and the print size with the length of the exposure table.

In any of these methods, a light shield plate may be provided for preventing printing light for printing one photosensitive sheet on the exposure table from leaking onto photosensitive sheets placed on the exposure table adjacent to the one photosensitive sheet. Such a light shield plate may be an automatic light shield plate.

Also, the photosensitive sheets may be fed onto the exposure unit keeping equal intervals between the adjacent sheets.

Otherwise, the photosensitive sheets may be fed onto the exposure unit keeping predetermined distances between the adjacent sheets, the predetermined distances being determined according to print sizes.

In another preferred embodiment, if the sheets being fed on the exposure table are of the same size, the intervals between the adjacent photosensitive sheets are kept constant, the sheets being discharged one after another if the time during which no sheets are being printed exceeds a predetermined value.

In the method according to this invention, photosensitive material is printed in exactly the same ways in the prior art. But in the present invention, a plurality of photosensitive sheets are fed so that one sheet is cut while printing another sheet. This parallel processing is possible by feeding a plurality of sheets on the exposure table at a time.

Sheets may be discharged from the exposure table as soon as they are printed. Otherwise, they may be kept on the exposure table for a while after printed. In this case, a plurality of sheets, i.e. those printed, being printed, and not yet printed, are arranged on the exposure table at predetermined intervals. These sheets are moved all at once, so that when one sheet is moved to the printing position, another sheet is discharged from the exposure table.

In this way, sheets can be printed one after another with practically no waste of time between printings, so that the printing efficiency improves dramatically, compared with the conventional method.

Heretofore, after printing one sheet, a web of photosensitive paper was fed, and a sheet was cut from the web and fed into the printing position. Thus, a long time was needed after one sheet had been printed until another sheet is fed to the printing position. In contrast, according to this invention, one sheet is cut and fed to the printing position simultaneously when another sheet has been printed and fed one pitch ahead, so that the printing time can be shortened.

The number of photosensitive sheets which can be placed on the exposure table at a time is determined based on signals that designate print sizes. If judgment is made that a predetermined number (not one) of sheets can be placed on the exposure table at a time, one sheet is cut and fed to the printing position simultaneously when another sheet has been printed and moved out of the printing position. The number of sheets which can be placed on the exposure table at a time is determined by comparing the feed length of the web of photosensitive material determined by the print size with the length of the exposure table.

The number of photosensitive sheets to be placed on the exposure table at a time may be determined by calculating the feed length and the print sizes of the adjacent sheets from data on image sizes detected by a scanner and comparing the feed length and the print size with the length of the exposure table. If a negative film scanned by the scanner has even one panorama-size frame, the image in this frame has to be printed on a panorama-size photosensitive sheet. When printing a panorama-size sheet, it is impossible to parallel-process a plurality of sheets.

But other non-panorama-size sheets can be parallel-processed. Thus, the number of photosensitive sheets which can be placed on the exposure table should be determined based on both the print size and the scanner data. A light shield plate can be used to prevent printing light for printing one photosensitive sheet on the exposure table from leaking onto photosensitive sheets placed on the exposure table adjacent to the one photosensitive sheet. When the print size is changed, the light shield plate is replaced with a new one having a size corresponding to the new print size. An automatic light shield plate can adjust the size of its light shield frame according to the print size.

If a predetermined number (not one) of sheets can be placed on the exposure table at a time, these sheets are fed onto the exposure table all at once. If not, they are fed onto the exposure table one at a time. A plurality of sheets can be fed onto the exposure table all at once or one at a time according the intervals between the adjacent sheets. Sheets can be fed keeping equal intervals between the adjacent sheets. The feed length of the photosensitive material is determined according to the print size. The following are the standardized feed lengths: 82.5, 89, 102, 117, 120, 127, 152, 165, 178, 203, 210, 216, 240, 254, 279, 297, 305, 381 and 457 mm.

If sheets are fed so that three sheets are always on the exposure table, the intervals between the adjacent sheets are determined by the feed length of the photosensitive material.

But the intervals between the adjacent sheets may be kept constant. Thus, in this arrangement, more than three sheets may be on the exposure table at a time. Otherwise, the photosensitive sheets may be fed onto the exposure unit keeping predetermined distances between the adjacent sheets which are determined according to print sizes.

If the sheets being fed on the exposure table are of the same size, the intervals between the adjacent photosensitive sheets are kept constant, the sheets being discharged one after another if the time during which no sheets are being printed exceeds a predetermined value.

Other features and objects of the present invention will become apparent from the following description made with reference to the accompanying drawings, in which:

BRIEF DESCRIPTION OF THE DRAWINGS

FIGS. 5A is a sectional view and

DETAILED DESCRIPTION OF THE PREFERRED EMBODIMENT

An embodiment of this invention is described with reference to the drawings.

Figure 1:
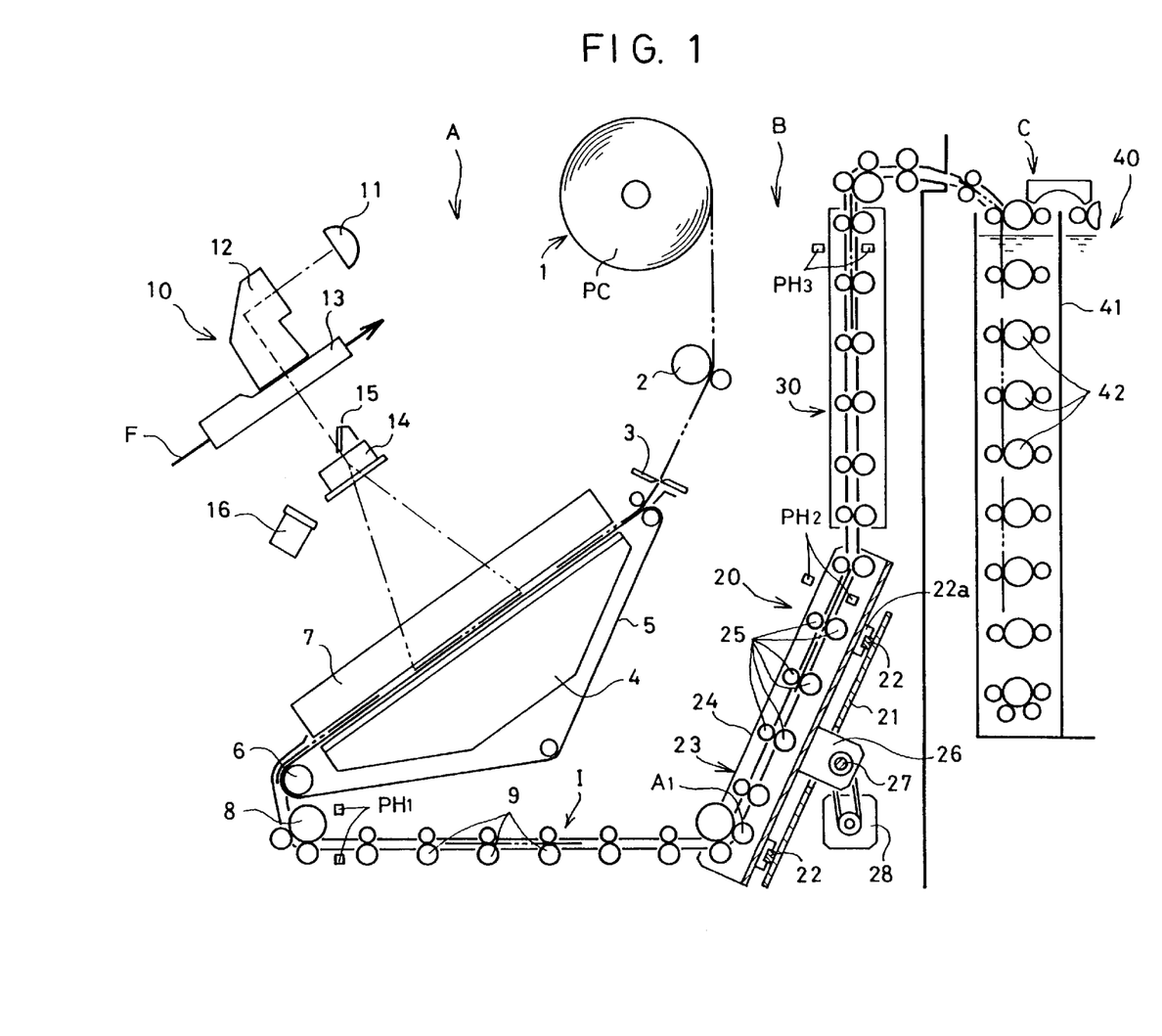
FIG. 1 is a schematic view of an entire photoprinting/developing machine of a preferred embodiment.

FIG. 1 schematically shows the entire structure of the photoprinting/developing machine of the invention. It comprises a printing/exposure section A, a carrier section B including a distributor, and a developing section C. The printing/exposure section A includes an exposure unit for carrying out the photoprinting method according to the present invention. The carrier section B and the developing section C are shown for reference only.

In the photoprinting method of the present invention, in order to print sheets of photosensitive material PC and discharge the printed photosensitive sheets as efficiently as possible, they are fed so that a plurality of (three in the illustrated embodiment) photosensitive sheets are always on an exposure table 4, if the photosensitive sheets used are of an ordinary service size (such as size E, 117×82.5 or size L, 127×89). It is especially important to improve the printing efficiency considering the fact that, in order to improve the developing efficiency, the carrier section B has a distributor 20 capable of feeding photosensitive sheets PC in two staggered rows.

Figure 2:
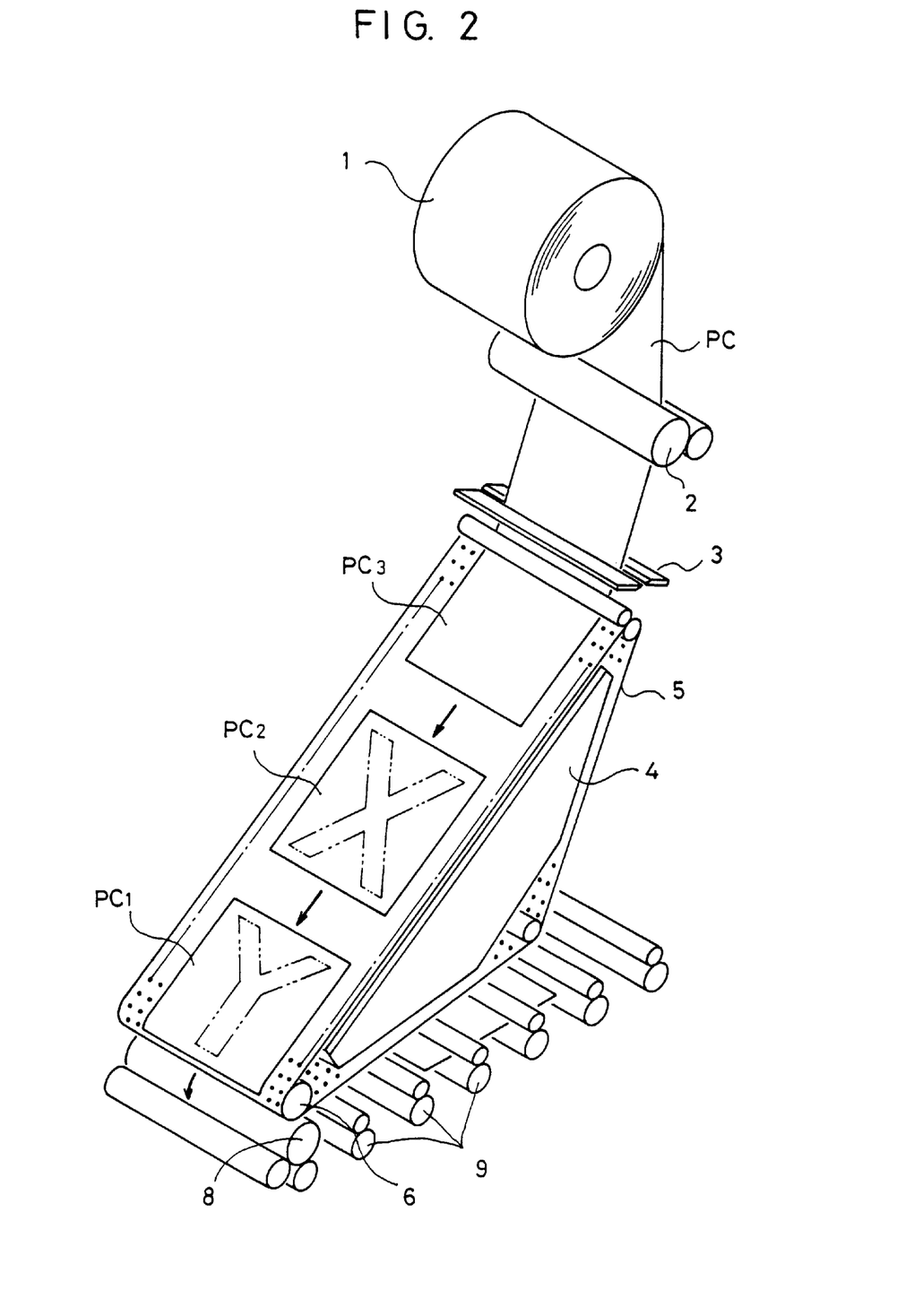
FIG. 2 is a partial perspective view of a printing/developing section.

In FIG. 1, numeral 1 designates a supply unit for supplying a web of photosensitive material; 2, a feed roller (letters M attached to some numerals indicate that these rollers are directly coupled to motors); 3, a cutter (its driving unit is not shown); 4, an exposure table; 5, a feed belt; 6, a feed roller; 7, an auto-papermask; and 8 and 9, feed rollers. FIG. 2 is a perspective view of and around the exposure table 4, though the auto-papermask 7 is omitted for clarity of the figure.

The exposure means 10 shown in FIG. 1 comprises a light source 11, a mirror tunnel 12 for bending the optical path, a film mask 13, a lens 14, a reflecting mirror 15 and a scanner 16. Besides these elements, the exposure means 10 usually includes a light adjusting filter, a mirror tunnel, a shutter and sensors, though they are not shown.

To read image data from each image frame of a negative film F before printing, the lens 14 is removed from the optical path by moving it perpendicular to the plane including FIG. 1, and instead, the reflecting mirror 15 is moved into the optical path so that the light path is bent by the mirror 15 toward the scanner 16. The scanner can thus read the image data from the film F.

Figure 3:
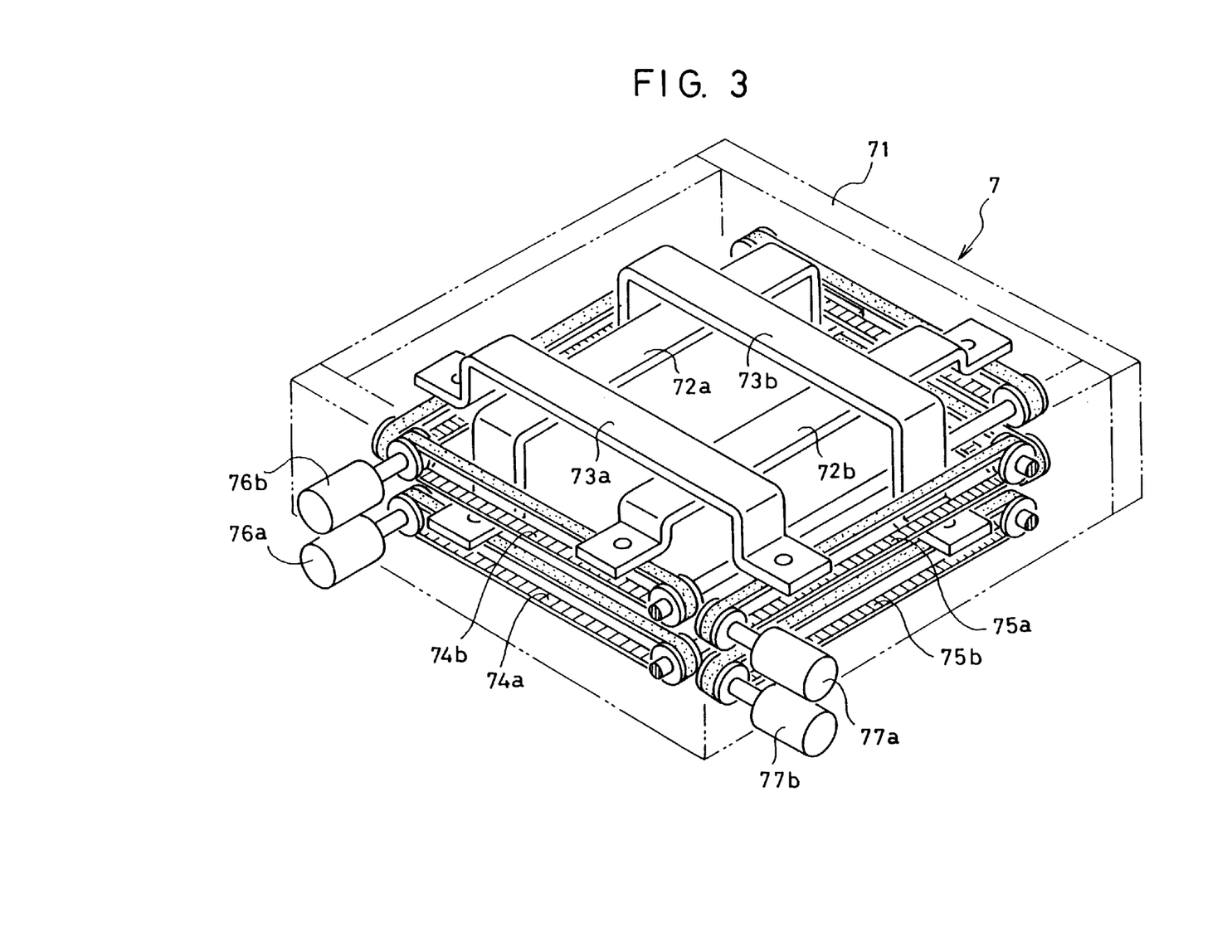
FIG. 3 is a perspective view of an auto-papermask.
Figure 4:
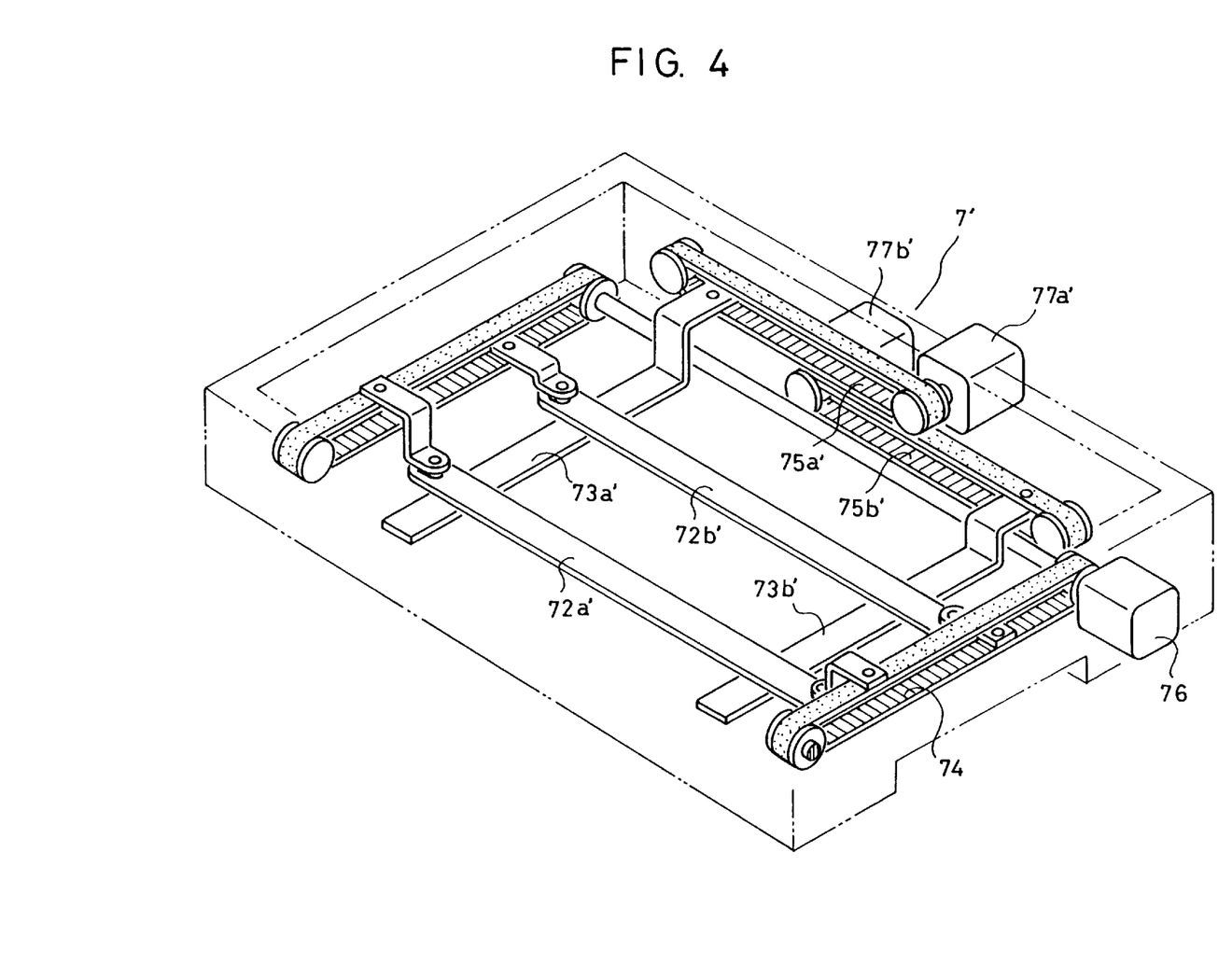
FIG. 4 is a perspective view of a different auto-papermask.

FIGS. 3 and 4 show two different kinds of auto-papermasks 7. We will later explain why an auto-papermask is needed. For detailed structure and function of the auto-papermasks shown in FIGS. 3 and 4, reference should be made to the specifications of Japanese Patent Applications 5-77947 and 5-133256. A different type of auto-papermask may be used. Their structures are briefly explained below.

Figure 7:
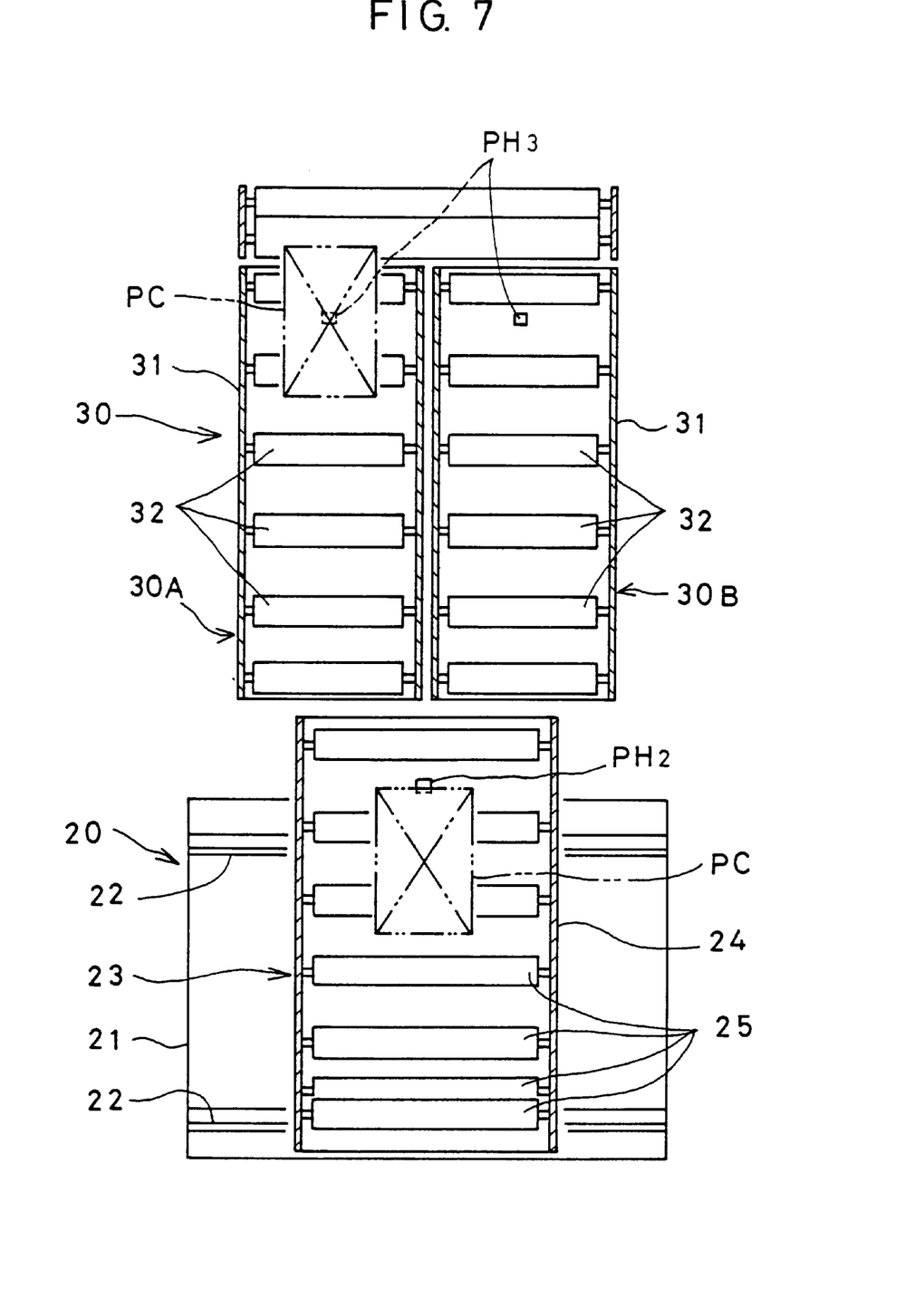
FIG. 7 is a developed plan view of a sheet distributor and a parallel carrier unit.

The auto-papermask 7 shown in FIG. 7 has a mask frame 71 in which are mounted a pair of masks 72a and 72b extending in the width direction, and a pair of masks 73a and 73b extending in the feed direction. They are driven separately by motors 76a, 76b and 77a, 77b through endless belts 74a, 74b and 75a, 75b, respectively. Though not shown, the space between the masks 72a, 72b, 73a and 73b and the inner surface of the mask frame 71 is closed by a bellows to prevent the image-carrying light from one frame of film from being leaking out onto the adjacent frames.

The auto-papermask 7 shown in FIG. 4 differs from that of FIG. 3 only in that masks 72a' and 72b' in the width direction are driven through a single belt 75 by a single motor 76 provided on one side of the mask. Thus, like elements are denoted by like numerals with the dash (') affixed.

Besides these auto-papermasks 7, a fit-in type paper mask 7" such as shown in FIGS. 5A–6B may be used. While FIGS. 5A–6B show a manual-control paper mask, an automatic one having a spring and a motor or a cylinder may be used.

Figure 5A:
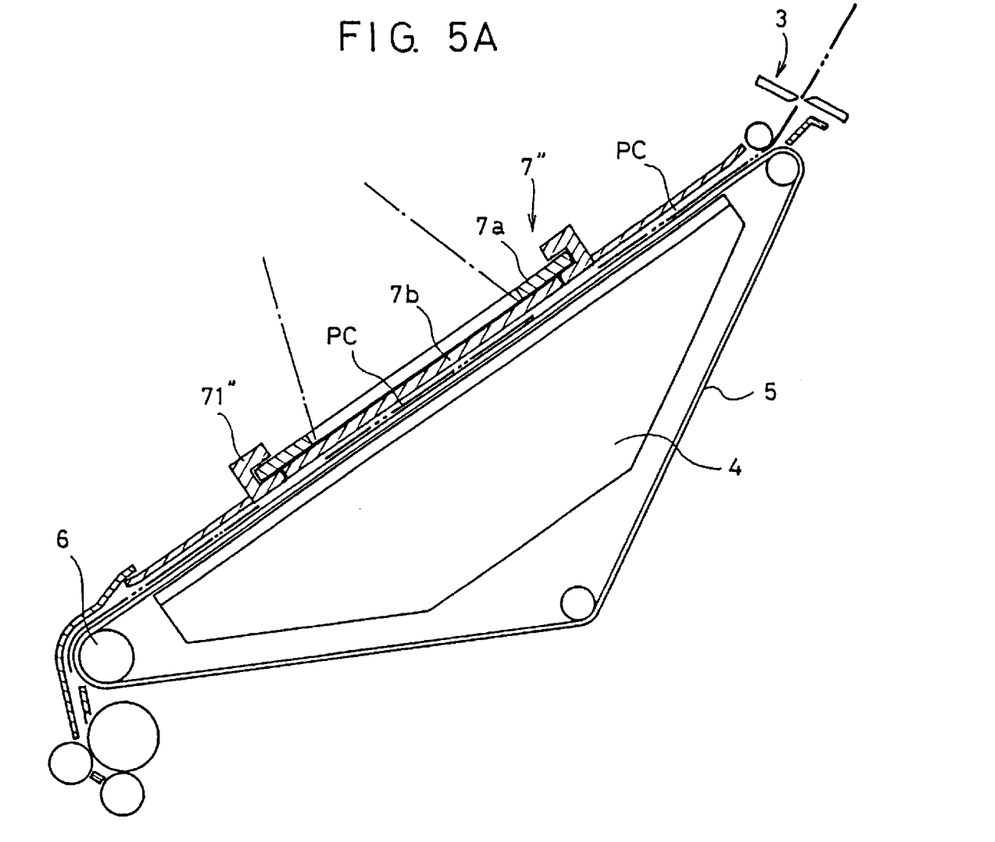
Figure 5B:
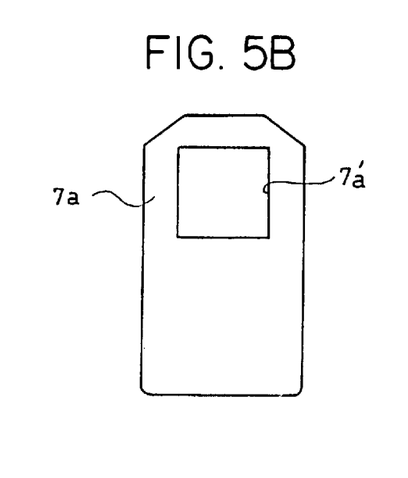
FIGS. 5B and 5C are plan views of positions a paper mask to be fitted on an exposure table, respectively.
Figure 5C:
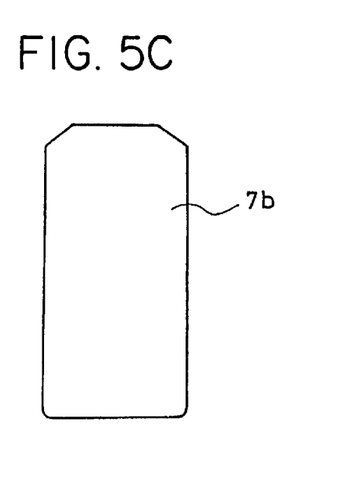

The fit-in type paper mask 7", comprising a paper mask plate 7a and a loading plate 7b as shown respectively in FIGS. 5B and 5C, is held by a mask frame 71" mounted on the exposure table 4. The paper mask plate 7a is selected from a plurality of paper mask plates of different sizes according to the size of the photosensitive sheets to be printed. It has an opening 7a'.

Figure 6A:
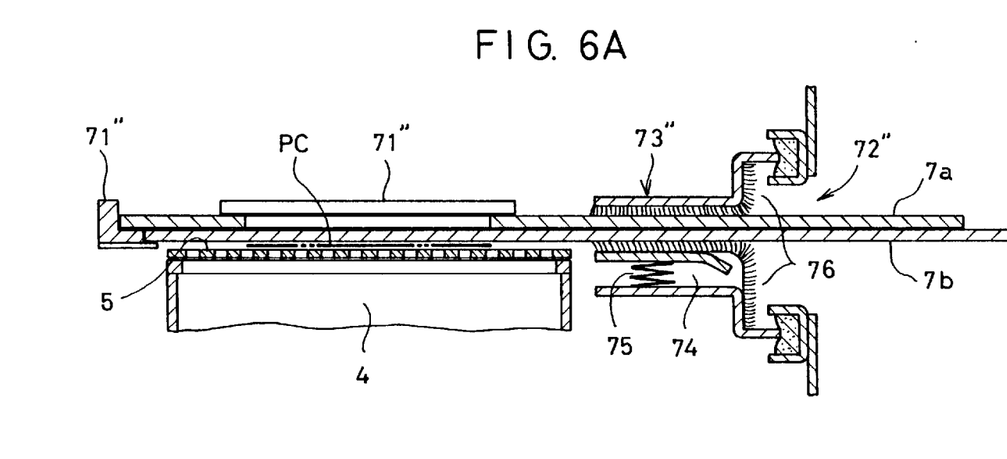
FIGS. 6A and 6B are sectional views of the same at a printing position.
Figure 6B:
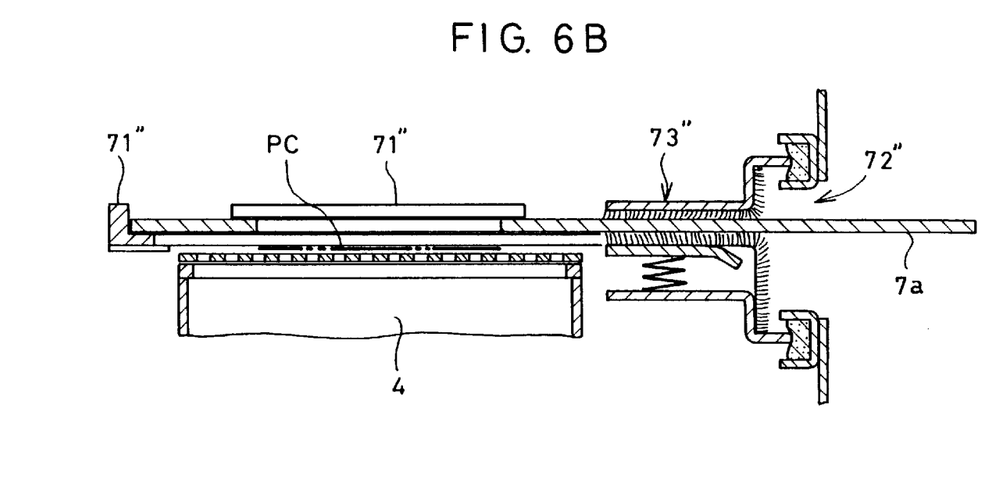

As shown in FIGS. 6A and 6B, the paper mask 7" (both the mask plate 7a and the loading plate 7b) is inserted through a slot 72" formed in one side of the exposure unit 4 and a hole formed in an inner portion 73" until it fits in the mask frame 71". When a photosensitive material PC is slid under the paper mask, only the loading plate 7b is pulled out as shown in FIG. 6B, leaving the sensitive sheet PC masked by the mask plate 7a. As soon as the loading plate 7b is pulled out of the hole in the inner portion 73", a light-shield plate 74, biased by a spring 75, is pressed against the mask plate 7a. Bristles provided in the surface of the hole in the inner portion 73" prevent the printing light from escaping through the inner portion 73". The loading plate 7b is inserted together with the mask plate 7a so that a photosensitive sheet PC can be smoothly slid under the paper mask.

Photosensitive sheets PC discharged from the exposure section A by the feed belt 5 are fed a predetermined distance by a carrier unit I comprising feed rollers 8 and 9 to the distributor 20 in the carrier section B.

FIG. 7 is a developed plan view of the distributor 20 and a parallel carrier unit 30. The distributor 20 is comprised of a base plate 21, rails 22 laid on the base plate 21 and extending in the direction perpendicular to the feed direction of photosensitive sheets PC, and a carriage 23 movable along the rails 22. The carriage 23 comprises a frame 24 and a plurality of pairs of rollers 25 mounted on the frame 24. The frame 24 is moved by sliding its bottom guides 22a (FIG. 1) along the rails 22.

The carriage 23 further includes an arm 26 extending from the bottom of the frame 24 through the base plate 21 to its back and having a threaded hole in its end protruding from the end plate 21. A ball screw 27 threadedly engages in the threaded hole. By rotating the ball screw 27 with a motor 28, the carriage can be moved right and left.

As shown in FIG. 7, the parallel carrier unit 30 comprises two parallel feed lanes 30A and 30B each comprising base plates 31 carrying a plurality of pairs of rollers 32. The rollers of the respective lanes 30A and 30B are driven by separate motors through separate endless belts (which are not shown) to feed photosensitive sheets PC. Their driving speed is changeable between high and low.

Each of the lanes 30A and 30B has a width substantially equal to the width of the exposure table 4. Thus, the entire parallel carrier unit 30, comprising the lanes 30A and 30B, has about twice the width of the exposure table. The distributor 20 has more than twice the width of the exposure table 4.

The developing section C is provided downstream of the parallel carrier unit 30. It has a tank 40 partitioned into a plurality of chambers by partitioning plates 41. The respective chambers are filled with different kinds of developing solutions for developing photosensitive sheets PC. In FIG. 1, only one chamber is shown. Pairs of rollers 42 are provided in each chamber for feeding photosensitive sheets in two rows.

Although the photoprinting/developing machine of the embodiment is used to print, feed and develop photosensitive sheets, we will hereinafter mainly describe the operation of the exposure section A, because this is the main feature of the present invention.

The photoprinting/developing machine of the embodiment can process sheets of photosensitive material having a width of up to 305 mm (12 inches) and a length of up to 457 mm (18 inches), while using ordinary 135 films. But these limitations in size may be set differently.

The exposure table 4 of the embodiment is sized so that three sheets of photosensitive material, each measuring up to 305 mm wide and 178 mm long, can be placed thereon simultaneously. If the photosensitive sheets used are larger in width and/or length than these values, they can be placed on the exposure table 4 only one at a time.

With this arrangement, it is possible to process "service-size" photosensitive sheets, which are less than 305 mm wide and 178 mm long and which are most often used for printing, with high efficiency. Even if the exposure table 4 is sized so that a plurality of photosensitive sheets having a width and/or length larger than the above values can be placed thereon simultaneously, the processing efficiency will not improve as a whole, because the distributor 20 cannot parallel-process such large sheets. Thus, such a large exposure table 4 is not necessary.

The distributor 20 can parallel-process photosensitive sheets having a width up to 152 mm and a length up to 305 mm. If processing photosensitive sheets which are larger in width and/or length than these values, they are fed through the distributor in a single row. Thus, the feed of photosensitive sheets is controlled in any of the following three different patterns.

Pattern A: Photosensitive sheets up to 178 mm long are placed on the exposure table, three at a time, and fed through the distributor in two rows.

Pattern B: Photosensitive sheets longer than 178 mm and up to 305 mm long are placed on the exposure table one at a time, and fed through the distributor in two rows.

Pattern C: Photosensitive sheets longer than 305 mm are placed on the exposure table one at a time, and fed through the distributor in a single row.

Figure 8:
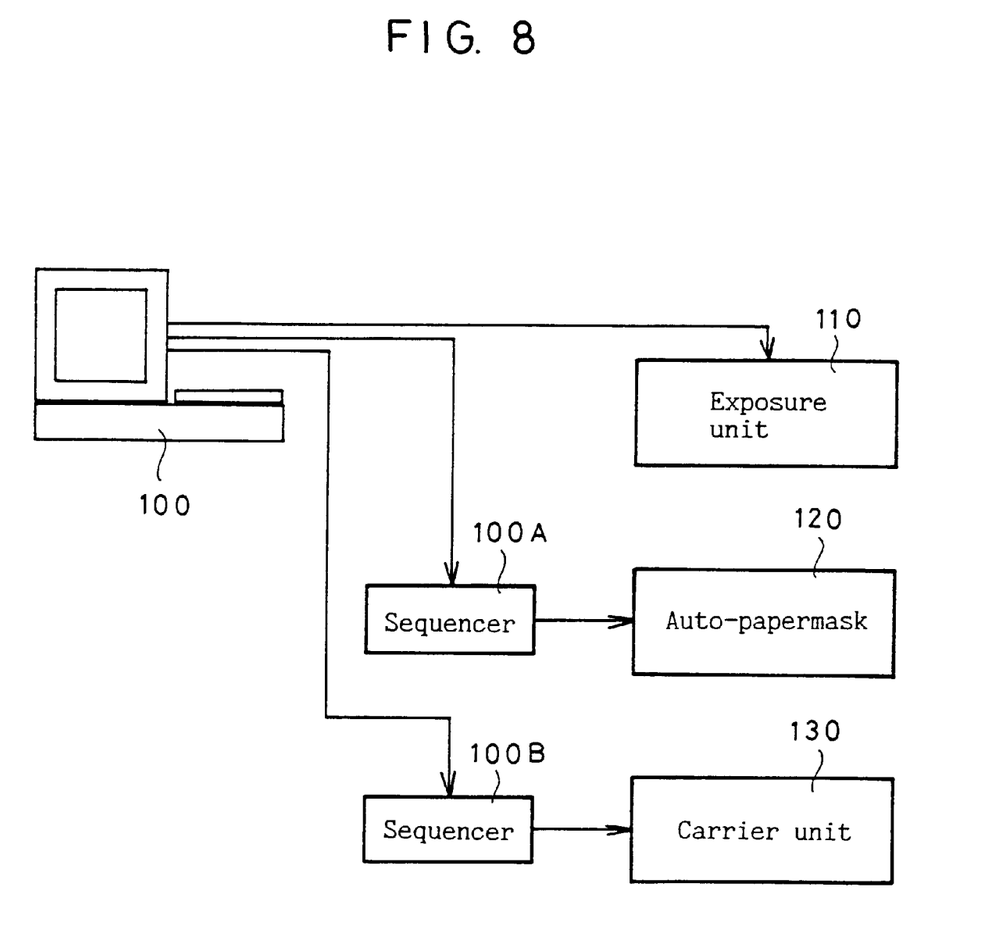
FIG. 8 is a schematic block diagram of an entire control unit.

FIG. 8 is block diagram of a control unit for controlling the feed of photosensitive sheets in the above manner, and for controlling the printing/exposure section. It includes a main computer 100 connected to a driving unit 110 for driving the exposure unit, a driving unit 120 for driving the auto-papermask through a sequencer 100A, and a driving unit 130 for driving the carrier unit through a sequencer 100B to control these driving units in a coordinated manner.

The driving unit 110 for the exposure unit includes a power source and drives for the light source 11, light-adjusting filter, shutter, scanner 16, lens 14 and reflecting mirror 15. The driving unit 120 for the auto-papermask includes motors for driving the mask shown in FIG. 3 or 4. The driving unit 130 for the carrier unit includes motors for driving the feed roller 6 of the exposure table 4, and the feed rollers of the carrier unit I, distributor 20 and parallel carrier unit 30.

The outputs of photoelectric sensors PH1–PH3 provided along the feed path of photosensitive sheets are input in sequencer 100B.

Figure 9:
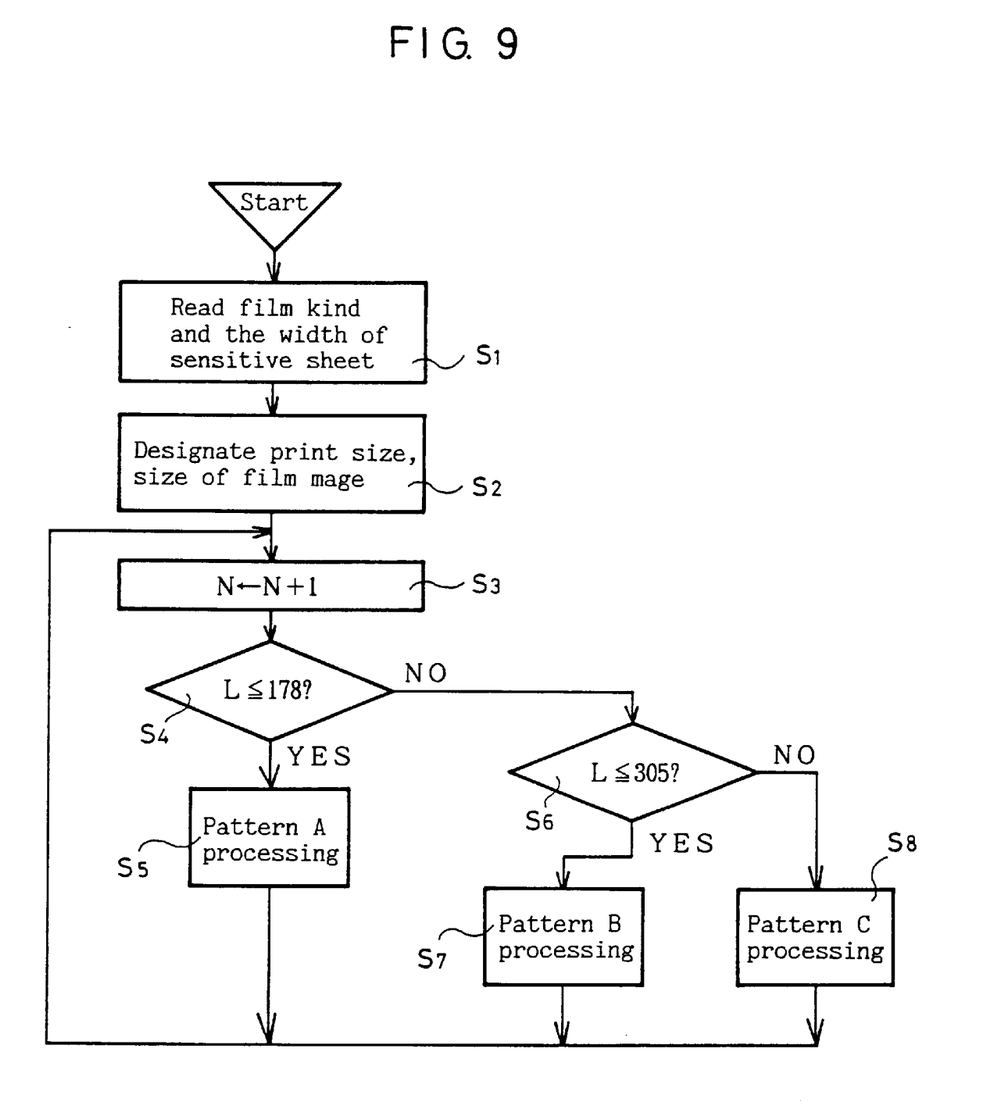
FIG. 9 is a flowchart showing how sheets are fed.

This control unit controls the feed of photosensitive sheets PC through the exposure table 4 and carrier units, following the flowchart shown in FIG. 9.

In Step S1, before feeding photosensitive sheets PC, the kind of film (e.g. size 135), the width and length of photosensitive sheets, print size, etc. are input in the memory of the computer 100. In Step S2, data on print size and the size of each image on the film are read out. Image data including the data on size of each image on the film are read by the scanner 16 and stored in the memory of the computer. After reading the image data, each film is rewound, and then fed into the printing unit, while simultaneously feeding photosensitive sheets PC into the printing unit from the supply unit 1.

At the beginning of printing, the number of photosensitive sheets N is zero. When a first sheet PC1 is cut by the cutter 3, the number N is set at N=1 in Step S3. Then in Step S4, determination is made whether or not three photosensitive sheets can be simultaneously placed on the exposure table 4, namely, whether or not each sheet is up to 178 mm long. If affirmative, the program proceeds to Step S5 to process photosensitive sheets in the pattern A.

The judgment in Step S4 is carried out based on data on the print size and the size of the film images. Namely, as long as each sheet is not so long as a panorama size print, judgement is made that three sheets can be simultaneously placed on the exposure unit 4 (NN>1).

Whether to place three sheets or one sheet at a time on the exposure table may be determined by comparing the length of the exposure table with the total length of three consecutive sheets or the total length of three consecutive sheets plus the distances between the adjacent sheets, which may be constant or may be varied according to print sizes.

If the print size determined based upon image data is so large that the pattern A processing is not possible (such size including panorama size), a negative judgment will be given in Step S4. Thus, the program proceeds to Step S6, where judgment is made whether or not L≧305.

Figure 10A:
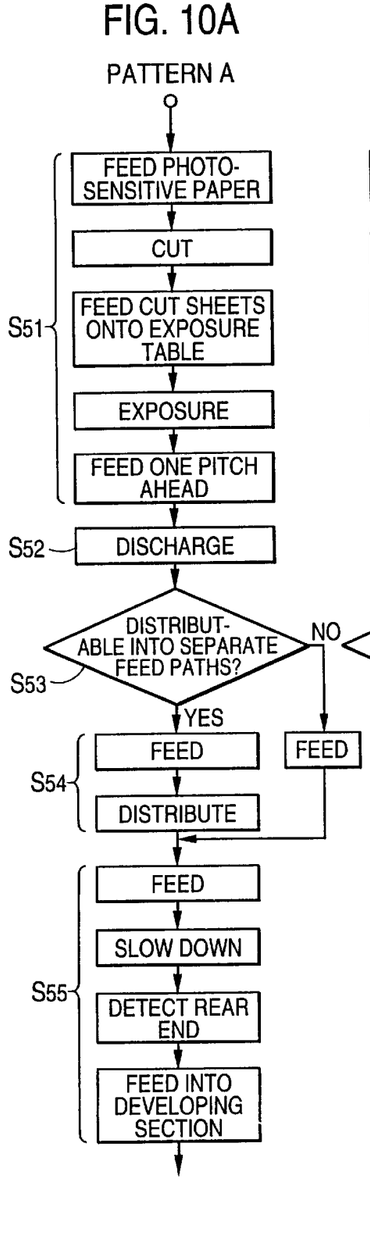
FIGS. 10A–10C are flowcharts in feed patterns A, B and C, respectively.
Figure 10B:
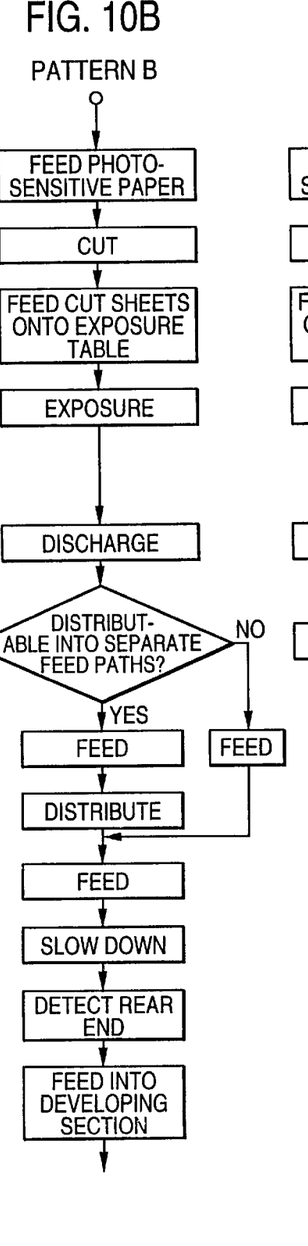
Figure 10C:
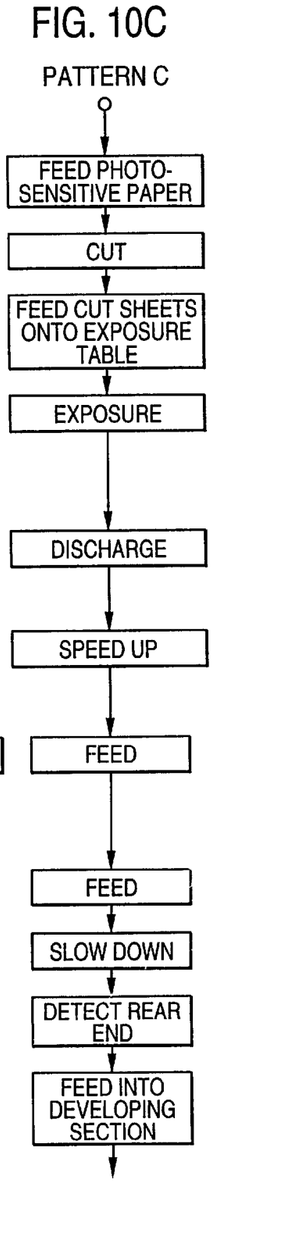

FIGS. 10A–10C show the details of the processing patterns A, B and C.

If the pattern A is selected, in Step S51 in FIG. 10A, the computer feeds the web of photosensitive material to the cutter 3, cuts it to a plurality of sheets by activating the cutter, feeds the sheets onto the exposure table to print them. In the state of FIG. 2, three consecutive sheets PC1, PC2 and PC3 are on the exposure table, of which PC2 is being printed. Upon completion of the printing of the sheet PC2, these sheets are simultaneously moved one pitch ahead, so that the sheet PC1 is discharged from the exposure table, while the sheet PC 3 is now moved to the center of the exposure table for printing.

Since three sheets are placed close to each other on the exposure table, the sheets on both sides may be exposed to light while printing the central one. This may blur the images on these sheets. The auto-papermask 7 is used to prevent this problem. The opening of the auto-papermask 7 is automatically adjusted according to the print size or the size of the image on film.

By the time the first sheet PC1 is discharged from the exposure table, the following three sheets PC2, PC3 and PC4 are on the exposure table. In this state, judgment is made whether to feed the printed sheets in two rows or in a single row in Step S53.

Namely, if the sheet PC1 is equal to or shorter than 153 mm, the sheets are fed in two staggered rows by moving the carriage 23 right and left to distribute e.g the sheets PC1 and PC3 to the right lane and the sheets PC2 and PC4 to the left lane.

Figures 11A, 11B:
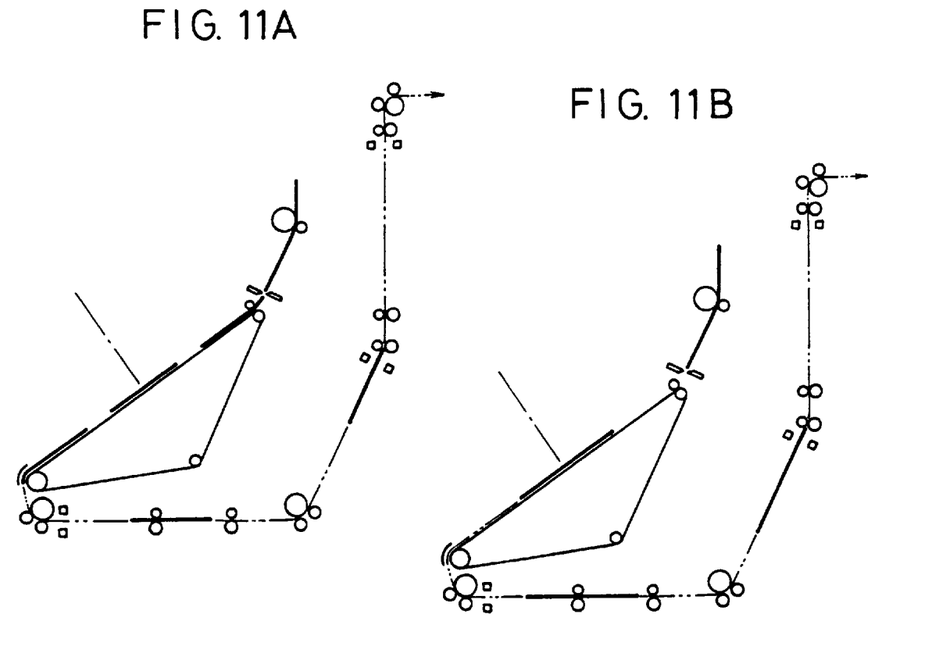
FIGS. 11A–11D are schematic views showing how sheets are fed in respective feed patterns.

Simultaneously when the sheet PC1 is fed into the distributor 20, the sheet PC2 is fed into the carrier unit I. In this state, as shown in FIG. 11A, three sheets PC3–PC5 are on the exposure table. 4.

In Step S55, the sheet PC1 is discharged from one of the two lanes in the distributor 20 into the parallel carrier unit 30, where its feed speed is slowed down. When the photoelectric detector PH3 detects its rear end, it is fed into the developing section C.

In this arrangement, three sheets placed on the exposure table are moved one pitch ahead simultaneously when feeding another sheet into the distributor. Thus, it is possible to feed one sheet into the distributor, and simultaneously discharge another sheet from the exposure table, while cutting and feeding still another sheet to the printing position. Thus, photosensitive sheets can be processed extremely quickly, compared with the conventional arrangement in which each sheet is fed onto the exposure table only after the preceding one has been cut, printed and discharged from the exposure table.

If the pattern B is selected as shown in FIG. 10B, printed sheets are not fed a pitch ahead on the exposure table as in Step S51. Instead, printed sheets are immediately discharged from the exposure table in Step S52. Once fed into the carrier unit I, determination is made on whether or not the photosensitive sheet PC1 can be fed in parallel with other sheets. If its width is 152 mm or under, it can be fed in parallel with other sheets, if its length is between 178 mm and 305 mm. Thus, if the sheet PC1 is 150 mm or less in width, it is fed in parallel with other sheets. If wider than 150 mm, it is not fed alone as shown in FIG. 11B.

Figure 11C:
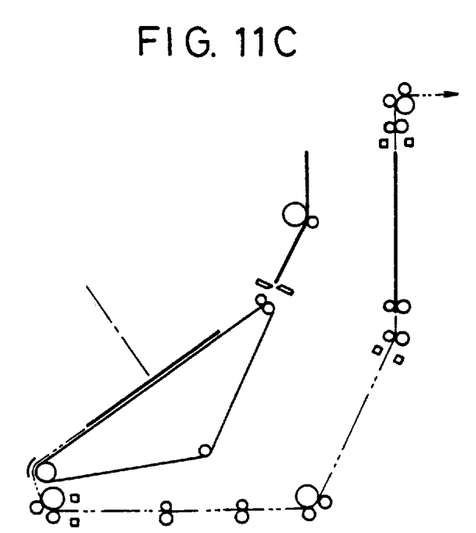

Any sheet longer than 305 mm is fed in the pattern C. Namely, such a sheet is fed in a single row. For example, if printing a panorama-size image on a photosensitive sheet, it is fed in the pattern C, irrespective of the designated print size. As shown in FIG. 10C, this sheet is discharged from the exposure table immediately after printing, instead of feeding it one pitch ahead on the exposure table in Step S51. Also, no determination is made in Step S53 on whether or not to feed this sheet in parallel with other sheets. This state is shown in FIG. 11C.

Figure 11D:
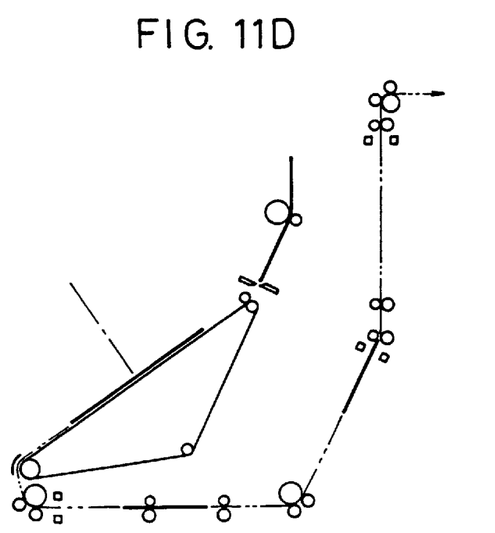

Sheets for printing one film may have to be fed in two or all of the patterns A, B and C. For example, if the film to be printed has both panorama-size frames and frames for size E prints, it is necessary to feed photosensitive sheets in two patterns A and B, as shown in FIG. 11D. In the state shown, two size E sheets are already in the carrier unit, while a single panorama-size sheet is on the exposure table. After printing the panorama-size sheet, a plurality of size E sheets will be fed onto the exposure table at one time.

What is claimed is:

1. A method of transferring images recorded on films onto sheets of photosensitive material by photoprinting, said method comprising the steps of feeding a web of photosensitive material from a supply unit to a cutter, cutting said web of photosensitive paper into a plurality of sheets, and feeding said sheets onto an exposure table for photoprinting, wherein if said sheets can be placed on said exposure table by a predetermined number which is not one at a time, said sheets are fed onto said exposure table so as to print one of said sheets and cut another one of said sheets simultaneously while discharging still another one of said sheets.

2. A method as claimed in claim 1 wherein the number of photosensitive sheets to be placed on said exposure table at a time is determined based on signals that designate print sizes.

3. A method as claimed in claim 1 wherein the number of photosensitive sheets to be placed on said exposure table at a time is determined by calculating the feed length and the print sizes of the adjacent sheets from data on image sizes detected by a scanner and comparing said feed length and said print sizes with the length of said exposure table.

4. A method as claimed in claim 1 further comprising the step of providing a light shield plate for preventing printing light for printing one photosensitive sheet on said exposure table from leaking onto photosensitive sheets placed on said exposure table adjacent to said one photosensitive sheet.

5. A method as claimed in claim 4 wherein said light shield plate is an automatic light shield plate.

6. A method as claimed in claim 1 wherein said photosensitive sheets are fed onto said exposure unit keeping equal intervals between the adjacent sheets.

7. A method as claimed in claim 1 wherein said photosensitive sheets are fed onto said exposure unit keeping predetermined distances between the adjacent sheets, said predetermined distances being determined according to print sizes.

8. A method as claimed in claim 1 wherein if the sheets being fed on said exposure table are of the same size, the intervals between the adjacent photosensitive sheets are kept constant, said sheets being discharged one after another if the time during which no sheets are being printed exceeds a predetermined value.

9. A method as claimed in claim 2 wherein the number of photosensitive sheets to be placed on said exposure table at a time is determined by calculating the feed length and the print sizes of the adjacent sheets from data on image sizes detected by a scanner and comparing said feed length and said print sizes with the length of said exposure table.

10. A method as claimed in claim 2 further comprising the step of providing a light shield plate for preventing printing light for printing one photosensitive sheet on said exposure table from leaking onto photosensitive sheets placed on said exposure table adjacent to said one photosensitive sheet.

11. A method as claimed in claim 3 further comprising the step of providing a light shield plate for preventing printing light for printing one photosensitive sheet on said exposure table from leaking onto photosensitive sheets placed on said exposure table adjacent to said one photosensitive sheet.

12. A method as claimed in claim 9 further comprising the step of providing a light shield plate for preventing printing light for printing one photosensitive sheet on said exposure table from leaking onto photosensitive sheets placed on said exposure table adjacent to said one photosensitive sheet.

* * * * *